United States Patent [19]

Cook et al.

[11] 3,887,588
[45] June 3, 1975

[54] PROCESS FOR MAKING NITROPHTHALIC ANHYDRIDES

[75] Inventors: Newell C. Cook, Schenectady, N.Y.; John M. Gasaway, Pittsfield, Mass.

[73] Assignee: General Electric Company, Schenectady, N.Y.

[22] Filed: May 8, 1974

[21] Appl. No.: 468,011

[52] U.S. Cl. .............................. 260/346.3
[51] Int. Cl. ............................. C07c 63/14
[58] Field of Search .................... 260/346.3

[56] References Cited
OTHER PUBLICATIONS

Lawrence, Chem. Abstracts, Vol. 15, 1921, pp. 94–95.

Primary Examiner—Henry R. Jiles
Assistant Examiner—Bernard Dentz
Attorney, Agent, or Firm—Joseph T. Cohen; Jerome C. Squillaro

[57] ABSTRACT

Nitrophthalic anhydrides can be obtained by a treatment of phthalic anhydride in concentrated sulfuric acid with concentrated nitric acid and thereafter extracting the formed nitrophthalic anhydrides with methylene chloride.

6 Claims, No Drawings

PROCESS FOR MAKING NITROPHTHALIC ANHYDRIDES

This invention is concerned with the process for making nitrophthalic anhydrides. More particularly, the invention is concerned with the process for making nitrophthalic anhydrides of the formula I 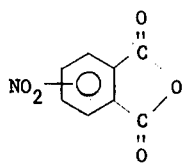

which comprises forming a solution of phthalic anhydride in a solvent composed of 98 to 100% concentrated sulfuric acid, contacting the said solution with 98 to 100% concentrated nitric acid within a temperature range between 85° to 110°C., and extracting the formed nitrophthalic anhydrides with methylene chloride.

Nitrophthalic anhydrides are employed in the preparation of polymers having good heat resistance. More particularly, these nitrophthalic anhydrides are first reacted with a dialkali-metal salt of, for instance, bisphenol-A [(2,2-bis-4-hydroxyphenyl)propane] to form a derivative having the formula II 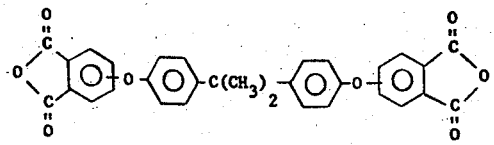

Thereafter the dianhydride of formula II can be reacted with organic diamines such as 4,4'-diaminodiphenylmethane, m-phenylene diamine, 4,4'-diaminodiphenyloxide, etc., to give polymers having extremely good high-temperature properties. Polyetherimides derived in the above manner are more particularly disclosed and claimed in the copending application of Darrell R. Heath and Joseph G. Wirth, Ser. No. 319,327, filed Dec. 29, 1972 now U.S. Pat. No. 3,847,867, which in turn is a continuation-in-part of their application Ser. No. 108,151 filed Jan. 20, 1971, now U.S. Pat. No. 3,787,475, issued Jan. 22, 1974, both applications being assigned to the same assignee as the present invention. The polyetherimides obtained in the manner described above can be used in various molding applications, for instance, as housings for appliances and for motors, as brake linings where heat resistance and other improved physical properties are essential, etc.

The nitration of many organic compounds has in the past used processes which are more amenable for batch operation than continuous processing. Because of the limitation of batch operation and the extreme acidic conditions employed, it would be desirable to improve the processing techniques by the use of a more efficient process.

Unexpectedly, we have discovered that we are able to nitrate phthalic anhydride by a simple process and to isolate the desired nitrated products in exceptionally good yields. Also, our process permits reuse or recycle of the unused reactants, the sulfuric acid solvent, and the methylene chloride employed for extraction purposes. More particularly, we have discovered that we can nitrate phthalic anhydride to give both the 3-nitrophthalic anhydride and the 4-nitrophthalic anhydride in almost quantitative yields, by using concentrated sulfuric acid as solvent for the reaction, employing concentrated nitric acid as the nitrating agent, and extracting the formed products with methylene chloride. In accordance with our discovery, the nitration reaction is expeditiously carried out at a temperature within the range of 85° to 110°C., and the sulfuric acid and methylene chloride used can be recycled and employed for additional reaction. Because it is important that the sulfuric acid, before it can be used again, be of a 98 to 100% concentration, and since the sulfuric acid resulting from the above-identified nitration reaction contains from about 3 to 7% water, the attainment of the higher sulfuric acid concentration is accomplished by either removing as much of the excess water as possible by heating (or distillation) and then completing the increase to the desired 98–100% concentration by adding $SO_3$ thereby converting any residual water to $H_2SO_4$, or adding $SO_3$ directly, without the heating step.

Finally, in contrast to the usual batch processing employed for nitration reactions, our process is especially amenable to a continuous nitration reaction wherein the nitric acid is fed into the solution of the sulfuric acid and the phthalic anhydride, and the effluent reaction product is readily treated with methylene chloride to extract the nitrophthalic anhydrides. The unused reactants can then be recycled either as obtained or with slight modification, specifically in connection with the restoration of the sulfuric acid concentration mentioned above.

There are several critical features of our invention. In the first place, the nitration reaction must be carried out at a temperature between 85° to 110°C. If the reaction is started below 85°C., it has been found that unreacted materials can accumulate and cause a precipitous rise in temperature. This is due to the fact that the nitric acid is so slow in nitrating phthalic anhydride at the lower temperature, that the nitric acid concentration builds up and then causes an uncontrollable and precipitous temperature rise. If temperatures above 110°C. are employed, the yield of the nitrated products is considerably reduced because some of the nitric acid decomposes to nitrogen oxides before it has a chance to nitrate the phthalic anhydride. For instance, at temperatures around 125°C. the yields have been found to decrease to about 60 to 70%. Fortuitously, the temperature range of 85° to 110°C. has been found to be an especially advantageous level for controlling the reaction since this can be done readily with cooling water.

The sulfuric acid solvent initially employed must be within the range of 98 to 100% $H_2SO_4$. If lower concentrations of $H_2SO_4$ solvents are initially employed, the amount of water liberated in the nitration reaction (with nitric acid) will cause problems as far as maintaining the nitrated product in a form which is soluble in the methylene chloride extractant. For instance, in the presence of the sulfuric acid solvent, the phthalic anhydride is in equilibrium with the phthalic acid. The idea is to drive the equilibrium to the anhydride state because it has been found that the nitrophthalic anhydride is quite soluble in methylene chloride whereas the nitrophthalic acid is very insoluble in methylene chloride. Thus, it is advantageous to start with a high concentration of the sulfuric acid which in this case is close to 100% so that there is a lower percentage of water in the $H_2SO_4$ as a result of the dilution of the $H_2SO_4$ by the water resulting from the nitration reaction. The concentration of the sulfuric acid can be built up again to restore it to close to 100% concentration by treating the diluted $H_2SO_4$ with sulfur trioxide. Thus, having driven the equilibrium toward the formation of the nitrophthalic anhydride rather than the nitrophthalic acid, the methylene chloride can perform its function of readily extracting the anhydride derivatives.

Also, the concentration of nitric acid must be within 98 to 100% concentration in order to minimize the amount of sulfur trioxide needed to raise the concentration of sulfuric acid after the nitration reaction has been completed. Since nitric acid is always being destroyed due to oxidative side reactions and is also decomposed to some extent in the presence of the sulfuric acid at the temperatures at which the reaction is carried out, and in order to maintain at least a molar equivalent of nitric acid for reaction with the phthalic anhydride, it is advisable to use a molar excess of the nitric acid based on the molar concentration of the phthalic anhydride. Thus, we have found that for optimum conditions and maximum yields, one should employ from about 1.1 to about 1.3 mols nitric acid per mol of phthalic anhydride. The fact that the nitric acid will come in contact with the $H_2SO_4$ only in the presence of a nitratable material, and since the nitration of phthalic anhydride proceeds quite rapidly, the loss of the nitric acid due to decomposition by the sulfuric acid is thereby kept at a minimum.

The amount of sulfuric acid used can be varied widely but generally it has been found that amounts ranging, by weight, from about 1 to 4 parts of the sulfuric acid per part of phthalic anhydride are advantageously employed in order to maximize yields and prevent solidification of the reaction product. Thus, by starting with 98 to 100% nitric acid and using a minimum of molar excess of nitric acid, it is possible to avoid precipitation of the nitrated products in solution after the nitration reaction is completed. NMR spectra show that in 96% sulfuric acid, greater than 98% of the product is in the form of the nitrophthalic acid; when 100% sulfuric acid is present, greater than 98% of the product is in the form of the nitrophthalic anhydride.

In order to maintain the equilibrium of nitrated derivatives in the direction of the more desirable nitrophthalic anhydride and to avoid precipitation of the nitrated products, and also to provide a medium for maximum extraction of the nitrophthalic anhydrides with methylene chloride, after the nitration is finished, sufficient $SO_3$ can be added to the nitrated mixture, after cooling it to room temperature, to restore the $H_2SO_4$ to at least 95% $H_2SO_4$. Obviously, the amount of $SO_3$ added will depend on the degree of dilution of the $H_2SO_4$ solvent. Generally, this can be calculated by determining the amount of water liberated based on the amount of nitric acid reacting with the phthalic anhydride, and also calculating the amount of water present in the nitric acid used initially. The sulfur trioxide addition can be accomplished by adding $SO_3$ to the nitrated solution at approximately room temperature.

The use of the methylene chloride as the extractant for isolating the formed nitro derivatives is also critical. Attempts to employ other halogenated derivatives such as chloroform, carbon tetrachloride, and methyl chloroform were unsuccessful for various reasons, including tendencies of the halogenated compositions to degrade or be converted to other products, or else they did not have the desired volatility and solubility affinity for the nitrated product to insure efficient and rapid utilization of the extractant. Only methylene chloride was found to be able to avoid the above problems and in addition was the only one of the lower aliphatic halides tried which was able to maintain its integrity sufficiently in a strongly acidic and hostile environment. The amount of methylene chloride used can be varied widely and is not critical. Thus, for each liter comprising the nitrated products and the sulfuric acid solvent, one can advantageously employ from about 0.5 to 8 to 10 liters or more of the methylene chloride depending on the technique used in the extraction. One important factor is to insure maximum contact, e.g., by stirring of the methylene chloride with the sulfuric acid solution in order to promote rapid and efficient extraction of the nitrated phthalic anhydrides.

The sulfuric acid solvent initially employed should be within 98 to 100% $H_2SO_4$. If lower concentrations of sulfuric acid solvent are employed initially, the amount of water liberated from the nitrating reaction will dilute the sulfuric acid to below 95% sulfuric acid concentration; this will cause formation of nitrated phthalic acids rather then nitrated phthalic anhydrides thereby causing serious separation problems during extraction of the methylene chloride for the reasons pointed out above. If the concentration of the resultant sulfuric acid (after the nitration reaction) is initially below about 95% sulfuric acid, then the nitrated product is so bound to the sulfuric acid that the nitrated product can not be efficiently extracted with the methylene chloride.

The sulfuric acid solvent should be used in such concentrations that there is adequate fluidity when making the solution of the phthalic anhydride in the sulfuric acid. Generally, we have found that on a weight basis we can use from about 1.5 to 5 or more parts of the sulfuric acid per part of the phthalic anhydride. Obviously, the exact concentration of the phthalic anhydride in the sulfuric acid can be varied widely and would depend upon the temperature at which the reaction is carried out, the concentration of the sulfuric acid, and whether the reaction is on a continuous or batch basis.

In carrying out the reaction, the phthalic anhydride and the concentrated sulfuric acid solvent are mixed together in a reactor equipped with a stirrer and means for heating or cooling the reactor. After heating the solution to the desired temperature and while stirring is maintained, the concentrated nitric acid is added slowly with stirring of the solution, under the surface of the sulfuric acid solution, over a period of time advantageously ranging from about 10 minutes to about one hour or more. After stirring the mixture of the sulfuric acid solution and the nitric acid for a period of time ranging from about 30 minutes to about 2 to 3 hours at about 85° to 110°C., sufficient sulfur trioxide is added to react with the water formed from the nitration reaction so as to restore the $H_2SO_4$ concentration to above 95%. This is to insure that the nitrated product is sufficiently high in the nitrophthalic anhydride form. The amount of water formed in the nitration reaction can be readily calculated from the stoichiometry of the reaction. Generally, since one mol of water is formed in the nitration reaction per mol of phthalic anhydride nitrated, and since 98% nitric acid (including any excess nitric acid) will generally carry additional water into the reaction mixture, sufficient $SO_3$ should be added to raise the sulfuric acid above 95% concentration. Excessive sulfur trioxide can be used but this is usually not necessary.

Thereafter the reaction mixture is led to a closed loop extractor for the continuous extraction of the sulfuric acid solution with the methylene chloride. This closed loop extractor can resemble a Dean-Stark apparatus and consists of an extraction column equipped with a stirrer into which the reaction product is introduced. Methylene chloride (extractant) is introduced continuously into the bottom of the extraction column. At the upper end of the extraction column is an arm through which the overflow of the extractant and reaction product (separated from the $H_2SO_4$) is carried into a reservoir equipped with a heater operable within a range of from about room temperature to 100°C. whose function is to evaporate the $CH_2Cl_2$ and concentrate the nitrated phthalic anhydrides. The $CH_2Cl_2$ vapor is condensed and recycled by gravity to the bottom of the extraction column and continues recycling until extraction is complete. At this point, all the nitrated product is in the $CH_2Cl_2$ contained in the reservoir. Other techniques, such as countercurrent extraction can obviously be employed in isolating the nitrophthalic anhydrides.

In order that those skilled in the art may better understand how the present invention may be practiced, the following example is given by way of illustration and not by way of limitation.

EXAMPLE 1

Employing the equipment described above, about 38.5 grams (0.6 mol) 98% nitric acid was added to a stirred solution of 74 grams (0.5 mol) phthalic anhydride in 145 grams 100% $H_2SO_4$ at a temperature of 95° to 100°C. for a period of 15 to 20 minutes in the aforementioned reactor. Stirring was continued for about 30 minutes at this temperature and then the mixture was cooled to 20°–30°C. At this point 49.3 grams (0.64 mol) sulfur trioxide was added to react with the water formed in the nitration reaction (0.5 mol formed in the nitration and 0.14 mol carried in by the 38.5 grams of 98% $HNO_3$) thereby restoring the $H_2SO_4$ to about 100% concentration. The resultant solution was then transferred to the closed loop extractor described above for the continuous extraction of the acid solution. About one liter of dry methylene chloride was added to the evacuated closed loop extractor giving two sharply separated layers ($H_2SO_4$ solution as the bottom layer and a methylene chloride solution as the top layer) together with about 300 to 400 cc of extractant in the overflow boiler reservoir. The amount of methylene chloride continually passing through the sulfuric acid reaction solution was at the rate of about three liters per hour. The evaporation and condensation of the methylene chloride from the reservoir recycled the extractant by gravity flow back to the sulfuric acid at the rate of about three liters per hour, rapidly extracting the nitration products and accumulating them in the boiler reservoir. After about 8 hours of this continuous extraction, the extract solution (about 700 cc) was passed over anhydrous sodium sulfate to remove residual 2 to 3% sulfuric acid (and some nitric acid) contaminating the product. The methylene chloride solution was then evaporated under vacuum in a rotary film evaporator yielding about 90 grams of product of which 50%, by weight, was the 4-nitrophthalic anhydride, 45%, by weight, was the 3-nitrophthalic anhydride, and 5% being recovered phthalic anhydride.

The sulfuric acid obtained in the above nitration has been reused (after $SO_3$ treatment to bring the concentration up to 98–100% sulfuric acid) for four nitration reactions; the methylene chloride also showed no signs of deterioration, especially if water and air were excluded from the reaction system.

Because of the high boiling points of the 3-nitrophthalic anhydride and the 4-nitrophthalic anhydride and the tendency of these isomers to begin decomposition at temperatures as low as 200°C., it is important that careful consideration be given to the means for separating these two isomers if such a need should arise. Such care must be exercised because at atmospheric pressure the two isomers boil around 375°C. while at 1 millimeter pressure, the 4-isomer boils at 154°C. and the 3-isomer boils at around 178°C.

It has been found that good separation of the 3- and 4-nitrophthalic anhydrides by fractional distillation can be effected in a spinning band column employing from 15 to 25 theoretical plates and employing operating temperatures below 200°C. in the still pot. Good fractionation of the isomers can be obtained at a head pressure in the column of approximately 0.5 to 1.0 mm. and a still pot pressure of approximately 1 to 1.5 mm. in order to prevent thermal decomposition of the nitrophthalic anhydrides. Fractionation columns of sufficient separating capacity that depend on rigid packing cannot keep the pressure drop below 2 to 3 mm. in the still pot and only columns of the spinning band type can be used in a practical or commercial set up for separating the 3- and 4-nitrophthalic anhydrides.

Pressures much lower than 0.5 mm. for the fractionation are not practical because the 4-nitrophthalic anhydride melts at 119°C. and the 3-nitrophthalic anhydride melts at 164°C. It has been found that the refluxing temperature at the column head and throughout the take-off system must be kept at approximately 120°–130°C. for the 4-isomer and 165° to 175°C. for the 3-isomer. This can be accomplished by using a fractionating column with a reflux head and take-off system that are bathed in a boiling fluid with the appropriate boiling points. Using such a set up, essentially pure 4-nitrophthalic anhydride isomer (99 to 99.8% purity) has been removed from the head and pure 3-nitrophthalic anhydride has been removed from the still pot.

It will of course be apparent to those skilled in the art that in addition to the conditions, temperatures and concentrations employed in the foregoing examples, other conditions, temperatures of reaction and concentrations of ingredients can be used within the limits described without departing from the scope of the invention.

What we claim as new and desire to secure by Letters Patent is:

1. In the process for isolating a mixture of 3-nitrophthalic anhydride and 4-nitrophthalic anhydride from a solution of the two anhydrides in concentrated sulfuric acid, the improvement which comprises extracting the aforesaid two nitrophthalic anhydrides using methylene chloride as the extractant.

2. The process for obtaining nitrated derivatives of phthalic anhydride which comprises forming a solution of phthalic anhydride in a solvent composed of 98–100% concentrated sulfuric acid, contacting the said solution with 98–100% concentrated nitric acid in temperature range from 85° to 110°C., and thereafter extracting the nitrated products with methylene chloride to obtain a mixture composed essentially of 3-nitrophthalic anhydride and 4-nitrophthalic anhydride.

3. The process as in claim 2 wherein the nitric acid used is present in a concentration of from 1.1 to 1.3 mols nitric acid per mol of the phthalic anhydride.

4. The process as in claim 2 wherein the temperatures are within the range of from about 95° to 105°C.

5. The process as in claim 2 wherein the treatment of the sulfuric acid solution of the phthalic anhydride with the nitric acid, and the subsequent extraction of the formed nitro derivatives with the methylene chloride is carried out on a continuous basis.

6. The process as in claim 2 wherein the sulfuric acid concentration being extracted by the methylene chloride is at least 95% $H_2SO_4$.

* * * * *